US006600382B1

(12) United States Patent
Klymyshyn

(10) Patent No.: US 6,600,382 B1
(45) Date of Patent: Jul. 29, 2003

(54) MICROWAVE PHASE MODULATOR

(75) Inventor: David M. Klymyshyn, Saskatoon (CA)

(73) Assignee: Telecommunications Research Laboratories, Edmonton (CA)

( * ) Notice: Subject to any disclaimer, the term of this patent is extended or adjusted under 35 U.S.C. 154(b) by 0 days.

(21) Appl. No.: 09/450,523

(22) Filed: Mar. 14, 2000

(30) Foreign Application Priority Data

Nov. 26, 1999 (CA) ............................................ 2291551

(51) Int. Cl.⁷ ............................................... H04L 27/12
(52) U.S. Cl. ...................... 332/144; 332/100; 332/117; 332/127; 375/274; 375/302; 375/303; 375/305
(58) Field of Search ................................ 332/100, 144, 332/117, 127; 375/274, 302, 303, 305; 333/139, 164, 218

(56) References Cited

U.S. PATENT DOCUMENTS

| | | | |
|---|---|---|---|
| 3,263,154 A | 7/1966 | Steele | 333/218 X |
| 4,021,742 A | 5/1977 | Machida | 329/346 |
| 4,028,641 A | 6/1977 | Bodtmann et al. | 332/144 |
| 4,105,959 A | 8/1978 | Stachejko | 333/31 |
| 4,288,763 A | 9/1981 | Hopfer | 333/164 |
| 4,331,942 A | 5/1982 | Matsunaga et al. | 333/161 |
| 4,458,219 A | 7/1984 | Vorhaus | 333/164 |
| 4,539,535 A | 9/1985 | Miller et al. | 333/164 |
| 4,568,893 A | 2/1986 | Sharma | 333/157 |
| 4,638,269 A | 1/1987 | Dawson et al. | 333/164 |
| 4,647,789 A | 3/1987 | Upadhyayula | 327/240 |
| 4,734,591 A | 3/1988 | Ichitsubo | 333/218 X |
| 4,739,288 A | 4/1988 | Ide et al. | 332/19 |
| 4,788,509 A | 11/1988 | Bahl et al. | 330/54 |
| 4,837,532 A | 6/1989 | Lang | 333/164 |
| 4,859,972 A | 8/1989 | Franke et al. | 333/164 |
| 4,897,618 A | 1/1990 | Svetanoff | 331/76 |
| 5,119,050 A | 6/1992 | Upshur et al. | 333/164 |
| 5,309,124 A | 5/1994 | Cazaux et al. | 333/139 |
| 5,337,027 A | 8/1994 | Namordi et al. | 333/161 |
| 5,825,257 A | * 10/1998 | Klymyshyn et al. | 332/100 |

OTHER PUBLICATIONS

*The Art of Electronics*, Second Edition, Paul Horowitz and Winfield Hill, Chapter 13, "High Frequency and High–Speed Techniques", Cambridge University Press, 1989, p. 897–901.

Stepan and Robertson. "Analog Reflection Topology Building Blocks for Adaptive Microwave Signal Processing Applications", *IEEE Transactions on Microwave Theory and Techniques*, vol. 43, No. 3, Mar., 1995, P. 601–611.

Garver, Robert V. "360° Varactor Linear Phase Modulator", *IEEE Transactions on Microwave Theory and Techniques*, vol. MTT–17, No. 3, Mar., 1969, P. 137–157.

Ali and Mysoor. "An Analog MMIC Phase Modulator for X–Band Satellite Transponder Applications", *IEEE Microwave and Guided Wave Letters*, vol. 2, No. 11, Nov. , 1992, p. 445–446.

(List continued on next page.)

*Primary Examiner*—Arnold Kinkead
(74) *Attorney, Agent, or Firm*—Kenneth J. Pedersen; Barbara S. Pedersen; Pedersen & Co., PLLC

(57) ABSTRACT

A phase modulator for direct wideband linear phase modulation of a microwave continuous wave carrier signal which is suitable for many analog and digital phase or frequency modulation techniques. Linear phase modulation range in excess of 360 degrees is provided as a result of linear variation in the modulating signal. A conditioned baseband modulating signal is injected into a highly linear fractional range phase shifter, operating at a subharmonic of the desired output frequency. A nonlinear circuit is used to perform frequency and instantaneous phase multiplication, thus expanding the linear phase modulation range to greater than 360 degrees at the desired output frequency. With special conditioning of the baseband modulating signal, the phase modulator can be made frequency agile in ultra-small frequency steps, without requiring a stable, frequency agile reference signal or frequency synthesizer.

51 Claims, 11 Drawing Sheets

OTHER PUBLICATIONS

Lucyszyn, Robertson, and Aghvami. "24 GHz Serrodyn Frequency Translator Using a 360° Analog CPW MMIC Phase Shifter", *Microwave and Guided Wave Letters*, vol. 4, No. 3, Mar., 1994, p. 71–73.

Klymyshyn, Kumar, and Mohammadi. "A Linear Reflection Phase Shifter with Optimised Varactor Gamma", accepted for publication in *Electronics Letters*, May 22, 1997, copy of letter of acceptance (1 page), but unpublished as of Jul. 18, 1997.

Klymyshyn, Kumar, and Mohammadi. "A 360 Degree Linear Microwave Phase Shifter with Fet Frequency/Phase Multiplier", Apr. 17, 1997, 13 pages, accepted for publication in *Microwave Journal* Jun. 3, 1997, copy of letter of acceptance (1 page), but unpublished as of Jul. 18, 1997.

Linear reflection phase shifter with optimised varactor gamma, D.M. Klymyshyn, S. Kumar and A. Mohammadi, Electronics Letters, Jun. 5th, 1997, vol. 33, No. 12, p. 1054–1055.

A 360° Linear Microwave Phase Shifter with a FET Frequency/Phase Multiplier, David M. Klymyshyn, Surinder Kumar and Abbas Mohammadi, Microwave Journal, Jul. 1997, vol. 40, N. 7, p. 130–137.

Chu, et al. "Monolithic Analog Phase Shifters and Frequency Multipliers for mm–Wave Phased Array Applications" *Microwave Journal*; Dec. 1986; pp. 105–117.

A Simple GMSK Modulator for Microwave and Millimeter–Wave Frequencies, David M. Klymyshyn and Surinder Kumar, Microwave Journal, Feb. 1999, pp. 88–104.

An Effective Linear Phase Modulator Architecture for Millimeter–wave Applications, David M. Klymyshyn, 1999 IEEE Canadian Conference on Electrical and Computer Engineering (CCECE'99), Edmonton, Canada, May 1999, pp. 68–72.

Frequency Agile Phase Modulator for Emerging Microwave and Millimeter–wave Applications, David M. Klymyshyn, accepted for presentation at IEEE/IEE International Conference on Telecommunications (ICT 2000), Acapulco, Mexico, May 2000, 4 pages, with acceptance letter dated Mar. 16, 2000.

Direct Microwave Frequency Modulation for a 155.52 Mbps 17.7 to 19.7 GHz Radio for ATM Traffic, Surinder Kumar, Abbas Mohammadi, and David Klymyshyn, Asia–Pacific Microwave Conference, New Delhi, India, Dec. 1996, pp. 1447–1450.

Modulation/Microwave Integrated Digital Wireless Developments, Kamilo Feher and Hussein Mehdi, IEEE Transactions on Microwave Theory and Techniques, vol. 43, No. 7, Jul. 1995, pp. 1715–1732.

GMSK Modulation for Digital Mobile Radio Telephony, Kazuaki Murota and Kenkichi Hirade, IEEE Transactions on Communications, vol. Com–29, No. 7, Jul. 1981, pp. 1044–1050.

Differential Detection of Gaussian MSK in a Mobile Radio Environment, Marvin K. Simon and Charles C. Wang, IEEE Transactions on Vehicular Technology, vol. VT–33, No. 4, Nov. 1984, pp. 307–320.

Directly Modulated VSAT Transmitters, Surinder, Kumar, Microwave Journal, Apr. 1990, pp. 255–264.

Advances in Constant Envelope Coded Modulation, John B. Anderson anmd Carl–Erik W. Sundberg, IEEE Communications Magazine, Dec. 1991, pp. 36–45.

Digital Transmission Systems, David R. Smith, Van Nostrand Reinhold Comany, New York, copyright 1985, pp. 270–275.

Handbook of Filter Synthesis, Anatol I. Zverev, John Wiley and Sons, Inc., New York, copyright 1967, pp. 70–71.

Full 360° Phase Shifting of Injection–Locked Oscillators, Xiangdong Zhang and Afshin S. Daryoush, IEEE Microwave and Guided Wave Letters, vol. 3, No. 1, Jan. 1993, pp. 14–16.

Frequency Stabilized Direct GMSK Modulator, David M. Klymyshyn, Surinder Kumar, and Abbas Mohammadi, Ninth IEEE International Symposium on Personal, Indoor and Mobile Radio Communications (PIMRC'98), Boston, MA, USA, Sep. 1998, 6 pages.

Local Multipoint Communications Systems: Network System Architectures for Broadband Internet Access, Y.H. Kim, D.J. Kim, H.W. Jeong, Proceedings of the 1998 17th Conference on Consumer Electronics, Los Angeles, CA, USA, Jun. 1998, pp. 244–245.

Millimeter radio access to multimedia services via LMDS, G.M. Stamatelos, D.D. Falconer, Proceedings of the 1996 IEEE Global Telecommunications Conference, London, UK, Nov. 1996, pp. 1603–1607.

Performance of GMSK with two–bit differential detection in a land mobile radio channel, Prabodh Varshney, Surinder Kumar and J.E. Salt, Can. J. Elect. & Comp. Eng., vol. 19, No. 1, 1994, pp. 37–43.

Minimum–Shift Keyed Modem Implementations for High Data Rates, Rodger E. Ziemer and Carl R. Ryan, IEEE Communications Magazine, Oct. 1983, pp. 28–37.

* cited by examiner

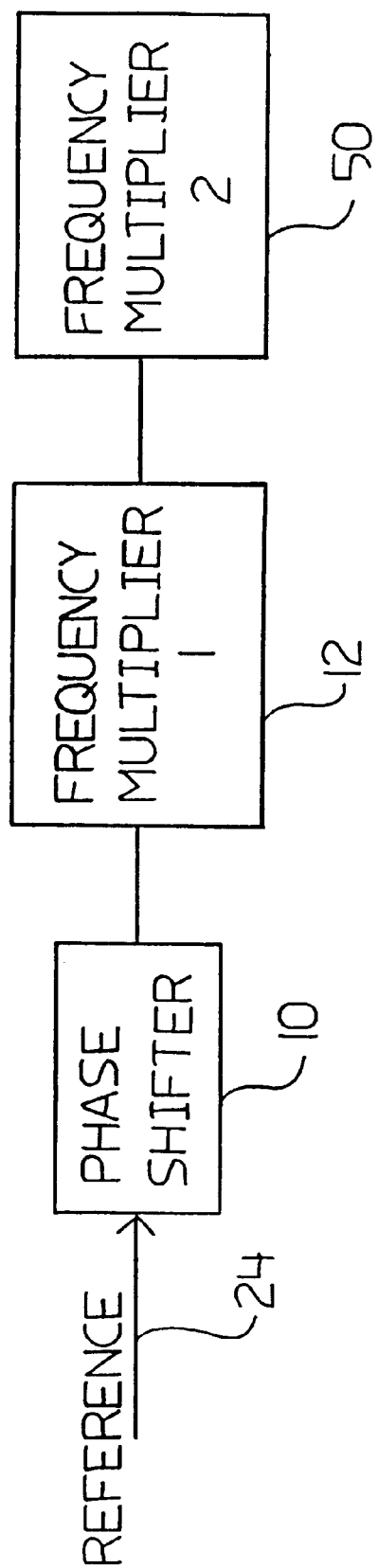

A) UNFILTERED MSK
B) 0.5 GMSK
C) 0.3 GMSK
D) 0.2 GMSK

A) UNFILTERED GMSK
B) 0.5 GMSK
C) 0.3 GMSK
D) 0.2 GMSK

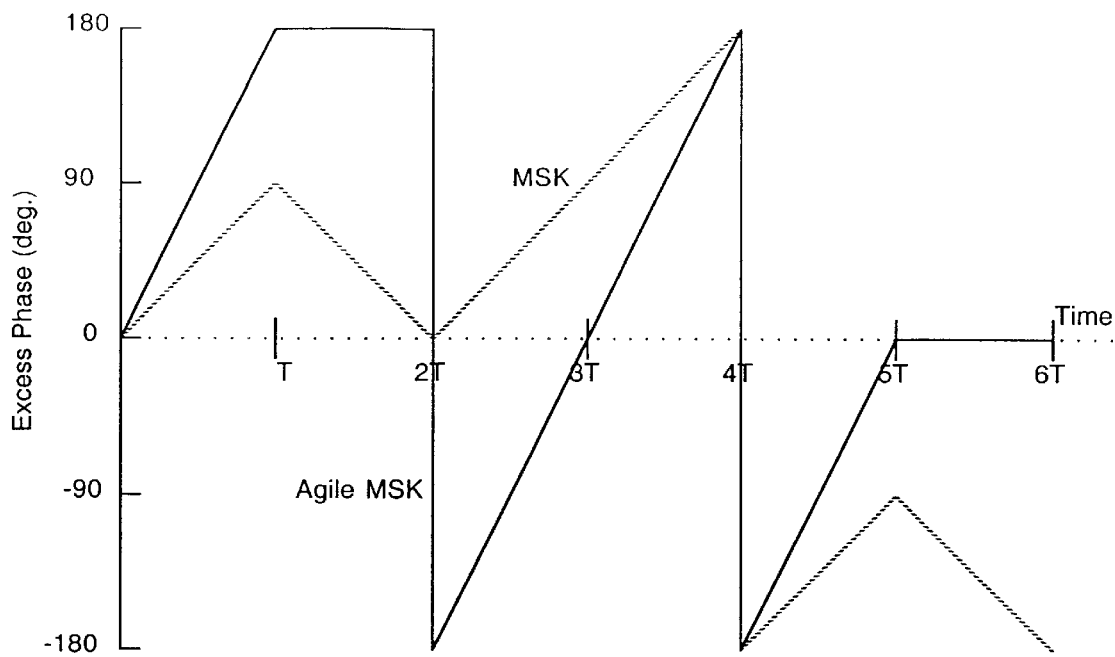
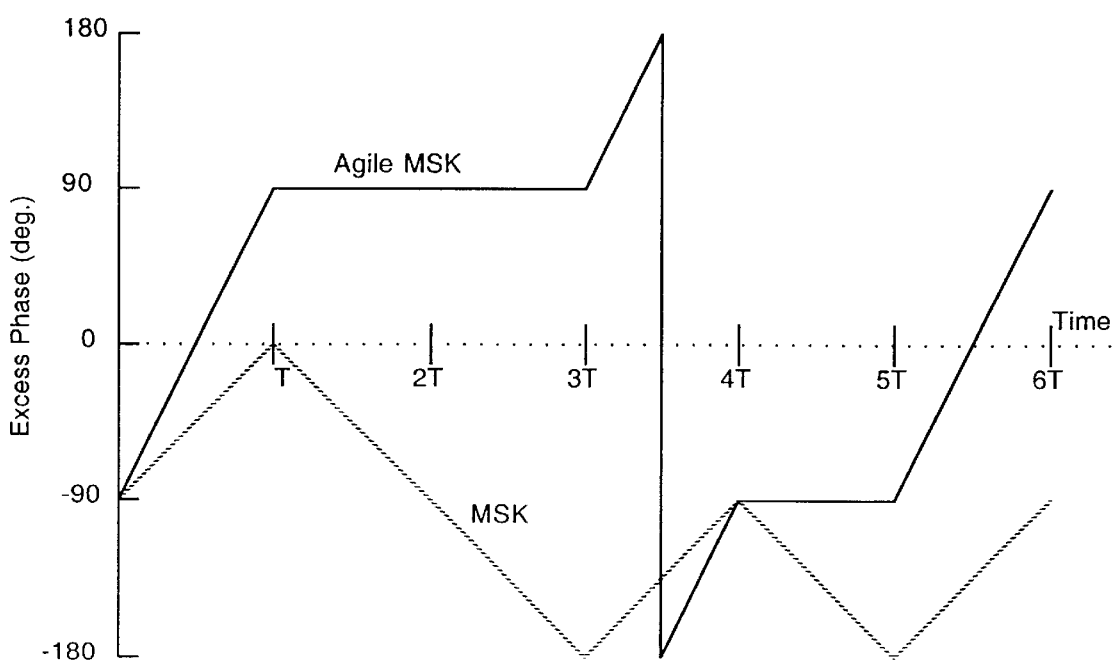
FIGURE 9

MICROWAVE PHASE MODULATOR

FIELD OF THE INVENTION

This invention relates to phase modulators, particularly for use in microwave circuit and communications applications.

BACKGROUND OF THE INVENTION

This invention finds use in a number of microwave modulator applications requiring direct, full 360 degree linear phase control of a carrier signal. The modulator can be used for analog phase modulation (PM) or digital phase modulation, including both phase shift keying (PSK) and continuous phase modulation (CPM) techniques. Another application of this modulator is for indirect frequency modulation (FM) or indirect frequency shift keying (FSK) modulation. Modulators employing any of these techniques can be made frequency agile. Other useful applications of the invention include phase synchronization of antenna and oscillator arrays, phased array antenna beam steering, and ultra-small carrier frequency translations.

A high performance, cost effective microwave phase modulator solution is very attractive in the design of microwave circuits and communication systems. One method of reducing the cost and complexity of the modulator is to exploit the advantages of directly modulating the microwave carrier signal. Direct modulation at the transmit frequency removes the requirement for multiple stages of intermediate frequency (IF) circuitry, upconversion, and filtering circuitry, which makes an elegant modulator architecture at microwave frequency feasible.

This invention is a simple and elegant hardware architecture for direct phase modulation, which is suitable for implementation at microwave frequencies. The modulator is based on a novel circuit architecture for achieving wideband linear phase modulation of a microwave carrier signal over the full 360 degree range with low phase error.

SUMMARY OF THE INVENTION

This invention presents an alternative hardware architecture for direct phase modulation at microwave frequencies. The modulator is based on a novel circuit architecture for wideband linear phase modulation of a microwave carrier signal over the full 360 degree range. With this method, a conditioned baseband modulating signal is injected into a highly linear phase shifter, operating at a subharmonic of the desired output frequency. A nonlinear circuit is then used to perform frequency and instantaneous phase multiplication, thus expanding the linear phase modulation range to greater than 360 degrees at the desired output frequency. With special conditioning of the baseband modulating signal, the phase modulator can be made frequency agile in ultra-small frequency steps, for any of the modulation techniques mentioned, without requiring a stable, frequency agile reference signal or frequency synthesizer.

This phase expansion and its application to direct linear phase modulation is the key to the invention. Use of the nonlinearity relaxes the linearity requirements of the phase shifter to a fraction of the desired 360 degree range, which makes realization of a highly linear fractional range phase shifter feasible. Using this nonlinear circuit technique, the modulator can achieve the high degree of linearity over the full 360 degree phase modulation range required for high performance phase modulation applications with low phase error. The modulator can readily be extended to very high microwave frequencies and have a large and highly linear phase modulation range, simply by increasing the order of the nonlinearity. The benefits of this new implementation include:

a. Simplified, cost effective hardware architecture, requiring only a single stage fractional range phase shifter, and very few or no active microwave devices.

b. Use of a frequency stable subharmonic reference signal, which is easier to obtain than the desired higher frequency carrier signal.

c. Use of a linear phase shifter over a fraction of the full 360 degree range resulting in higher phase linearity and low phase error.

d. Phase expansion in the linear modulation range by a factor equal to the order of the frequency/phase multiplier nonlinearity, which increases the linear modulation range in excess of 360 degrees. The phase error can be reduced without limit as the order of the nonlinearity is increased.

e. Extension to arbitrarily high microwave frequencies by increasing the order of the nonlinearity.

f. An effective increase in output bandwidth due to the frequency/phase multiplier by the order of the nonlinearity when compared with the subharmonically modulated signal.

g. Injection of conditioned baseband modulating signals to produce analog phase modulation (PM) or digital phase modulation, including both phase shift keying (PSK) and continuous phase modulation (CPM) techniques, as well as indirect frequency modulation (FM) or indirect frequency shift keying (FSK) modulation.

h. Frequency agility in ultra-small frequency steps, for any of the modulation techniques mentioned above, without requiring a stable, frequency agile reference signal or synthesizer.

i. Ability to provide rapid, frequency stable, ultra-small frequency or phase translations.

There is therefore provided in accordance with one aspect of the invention, a phase modulation device comprising a voltage controlled phase shifter having an input port for injection of a first signal having a first frequency and a first frequency/phase multiplier operatively connected to the voltage controlled phase shifter for receiving the first signal from the voltage controlled phase shifter and for translating the first signal to a second signal having a second frequency, the second frequency being higher than the first frequency.

In a further aspect of the invention, the phase modulation device comprises a voltage controlled phase shifter having an input port for injection of a first signal having a first instantaneous phase and an output port with a second signal having a second instantaneous phase and a first frequency/phase multiplier operatively connected to the voltage controlled phase shifter for receiving the second signal from the voltage controlled phase shifter and for expanding the instantaneous phase of the second signal to a value greater than 360 degrees.

In a further aspect of the invention, there is provided a method of phase modulating a signal comprising the steps of phase shifting a first signal at a first frequency and translating the first frequency to a second frequency, higher than the first frequency.

In a further aspect of the invention, the modulating signal is a baseband information signal.

In a further aspect of the invention, the phase modulation device comprises a baseband modulation circuit having an input port for input of a first baseband information signal and an output port for outputting a second baseband information signal which is conditioned for one of several types of frequency or phase modulation and a voltage controlled phase shifter having an input port for injection of a first signal having a first instantaneous phase and an input port for injection of the second conditioned baseband information signal and an output port for outputting a second signal having a second instantaneous phase which is proportional to the second conditioned baseband information signal and a first frequency/phase multiplier operatively connected to the voltage controlled phase shifter for receiving the second signal from the voltage controlled phase shifter and for expanding the instantaneous phase of the second signal to a value greater than 360 degrees.

In further aspects of the invention: the phase shifter preferably operates at microwave frequencies, the multiplier is formed with a field effect transistor, the multiplier has an integral multiplication factor; the voltage controlled phase shifter comprises a quadrature coupler having a pair of reflection ports and each of the reflection ports is terminated by equal reactive terminations; the reactive terminations comprise reverse biased varactor diodes, preferably abrupt or hyperabrupt varactor diodes with grounded series inductive reactances; to achieve higher multiplication factors, a second frequency/phase multiplier may be operatively connected to the first frequency/phase multiplier for receiving the second signal and for translating the second signal to a third signal having a third frequency, the third frequency being higher than the second frequency, the third signal preferably being a multiple of the second frequency; to achieve greater instantaneous phase expansion and/or lower phase error, a second frequency/phase multiplier may be operatively connected to the first frequency/phase multiplier for receiving the second signal and for further expanding the instantaneous phase of the second signal in a third signal having a third frequency, the third signal instantaneous phase being higher than the second signal and preferably greater than 360 degrees; the baseband modulation circuit accepts a baseband information signal, is comprised of a digital lookup table containing signal conditioning information, has a digital to analog converter, and outputs a conditioned baseband information signal for injection into the phase shifter.

In a still further aspect of the invention, the first frequency is translated in a FET, having a gate bias, the first signal has a signal level, and the gate bias and subharmonic input signal level are selected such that the FET has unconditional stability at all subharmonics of the second signal.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which:

FIG. 3 is a functional block diagram showing an implementation of the invention with multiple multiplier stages.

FIG. 9 shows sample waveforms representing the trajectory in carrier excess phase including discontinuity for MSK modulation with a frequency translation of ¼ $T_b$ from the apparent carrier frequency.

DETAILED DESCRIPTION OF PREFERRED EMBODIMENTS

The present invention is a novel device for achieving full 360 degree linear phase modulation of a microwave carrier signal or other microwave signal. In this patent document, microwave is taken to mean the range of frequencies from 1–100 GHz although it will be appreciated that the utility of the invention at higher frequencies is only limited by the present availability of components, and not by the principle of operation of the invention.

Figure 1:
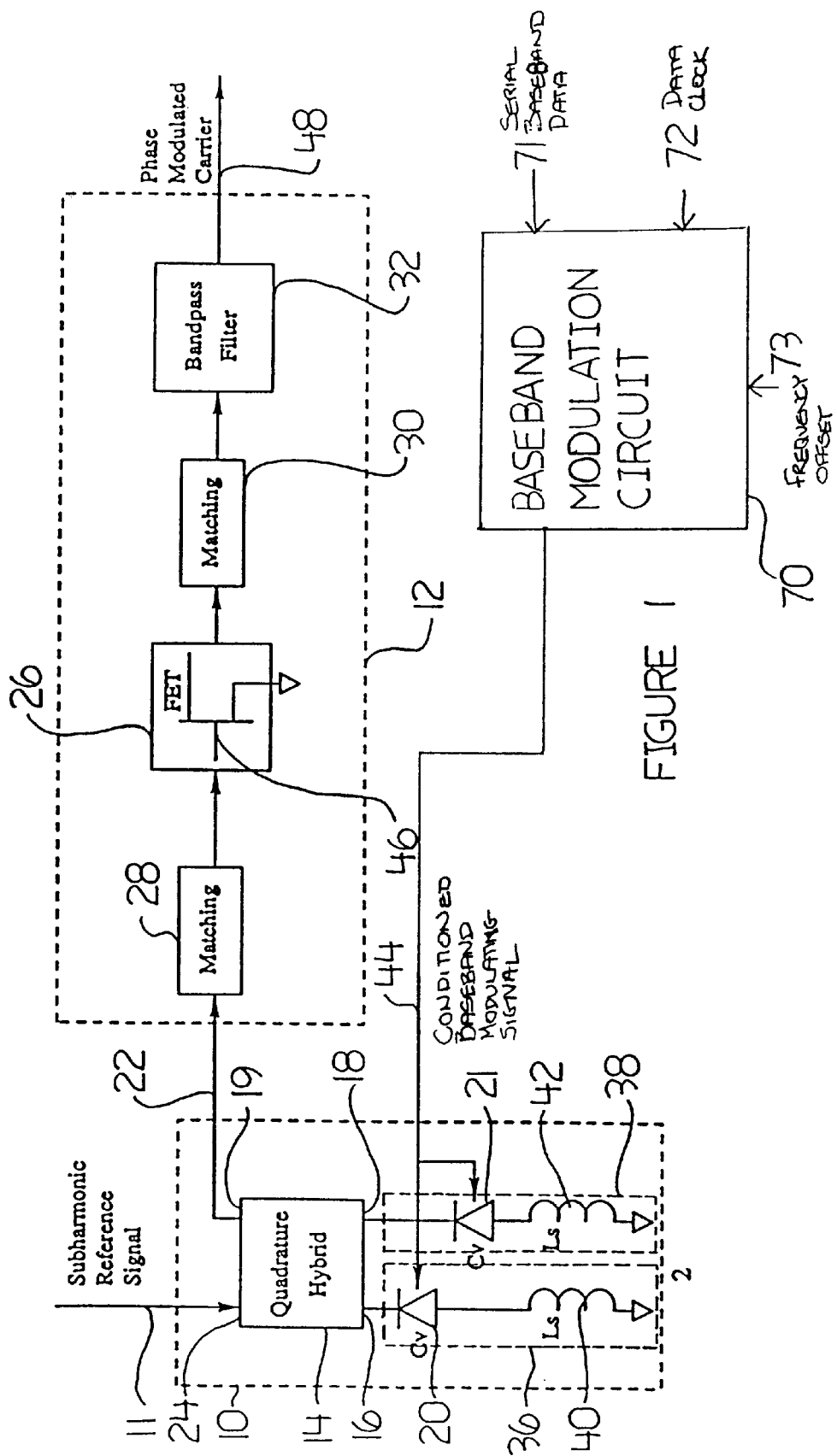
FIG. 1 is a functional block diagram of the 360 degree linear phase modulator.
Figure 2A:
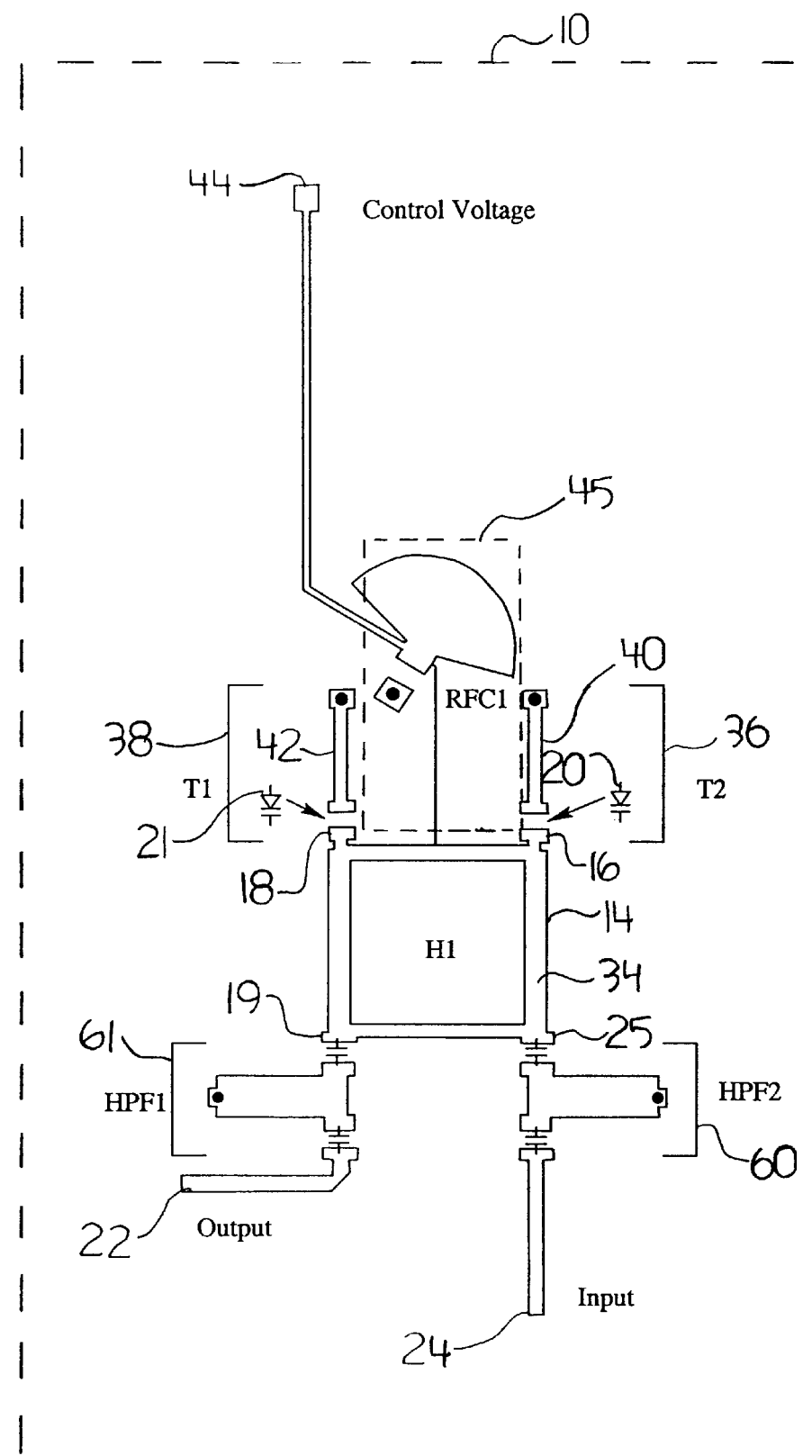
FIGS. 2A and 2B are respectively microstrip schematics for a phase shifter and frequency/phase multiplier for a 360 degree linear phase modulator.
Figure 2B:
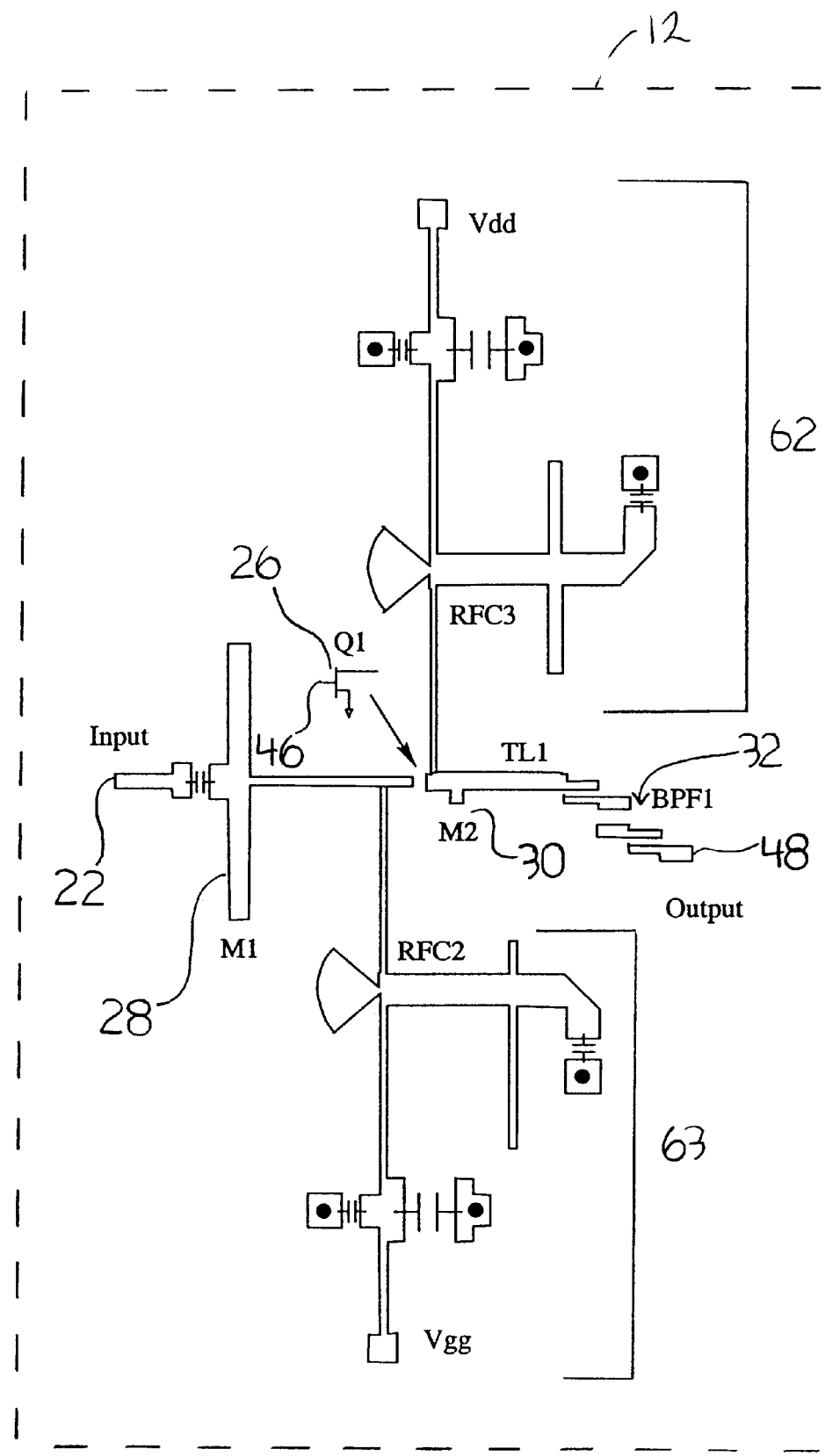

The functional block diagram of the 360 degree linear phase modulator is shown in FIG. 1. FIGS. 2A and 2B present microstrip schematics for the microwave portions of a 360 degree linear phase modulator implementation example at 18 GHz, using gallium arsenide (GaAs) hyperabrupt junction varactors and a single GaAs FET. Very few components are required to implement this invention at microwave frequencies, which makes it attractive for many applications.

The phase modulation device in one embodiment of the invention has three main functional elements. The first is a voltage controlled phase shifter 10 to which is operatively connected the second element which is a frequency/phase multiplier 12 for receiving phase shifted signals from the voltage controlled phase shifter 10 and translating the phase shifted signals to a higher frequency, while also expanding the effective linear phase shift range to greater than 360 degrees. The third element is a baseband modulation circuit 70 for generating conditioned baseband information signals for injection into the voltage controlled phase shifter 10.

Referring to the figures, a subharmonic reference signal from source 11, at ⅕ of the carrier frequency or 3.6 GHz for the sample implementation, is injected into the voltage controlled phase shifter 10 at +5 dBm. The phase shifter 10 is preferably a linear fractional range reflection type varactor phase shifter. The phase shifter 10 is comprised of a microstrip quadrature hybrid coupler 14, with a direct port 16 and coupled port 18 terminated in the same variable capacitance series inductance, inductor/capacitor (LC), reactive terminations 36, 38. The quadrature hybrid 14 is not especially wideband, but is simple, and provides adequate bandwidth for the sample implementation. Other wideband couplers or circulators could also be used. The variable capacitance characteristic is provided via reverse biased varactor diodes 20, 21. With ideal reactive terminations, all power is reflected from the direct and coupled ports 16, 18 and combines constructively at the isolated port 19 of the coupler 14 with no loss. In practice, some loss occurs from parasitic resistance in the terminations. The phase shift through the hybrid coupler 14 is a function of the termination reactance, and thus, the phase can be modulated by varying the voltage on the varactors 20, 21 and changing the series capacitance.

The reference signal enters the input port 25 of the microstrip quadrature hybrid coupler 14 and is reflected to the isolated output port 19 of the coupler 14 by equivalent reactive terminations 36, 38 on the direct and coupled ports 16, 18 of the coupler 14. The reactive terminations are comprised of grounded inductively reactive sections of microstrip line 40, 42 and series reverse biased varactor diodes 20, 21. The varactor diodes 20, 21 provide a variable capacitance characteristic, resulting in variation in the phase of the reflection coefficients at the reactive terminations 36, 38 which is proportional to the conditioned baseband modulating signal injected into the quadrature hybrid coupler 14 at 44 through the RF choke 45 (FIG. 2A). The total series inductive reactance includes the parasitic series inductance of the varactor diodes 20, 21 and ground connections. The baseband signal is contained in the voltage controlled phase shifter 10, and effectively blocked from escaping through the input or output ports by highpass filters 60, 61. The highpass filter is realized using high Q porcelain microwave chip capacitors for the series capacitor elements and a shorted stub for the inductor element. The highpass filters 60, 61 provide rejection of >30 dB up to 700 MHz for the sample implementation and are adequate for suppression of high frequency baseband modulating signals.

The varactor capacitance versus voltage (CV) relationship that provides linear phase shift through the hybrid 14 is not linear. Obtaining linear phase shift from a reflective termination requires that the termination reactance be matched to the tangent function of the linear varactor bias voltage variation. An abrupt junction varactor, with gamma ($\gamma$) of 0.5, is generally suitable for matching to the tangent function, over a limited bias voltage range. With a subharmonic reference signal in the range of 3 to 5 GHz, the required minimum varactor capacitance becomes comparable to the varactor parasitic package capacitance. The result of this is a flattening of the CV characteristic and the termination reactance characteristic as a function of increasing bias voltage. With this situation, the abrupt junction varactor, with $\gamma$=0.5, no longer provides a good match to the tangent function, resulting in poor phase shift linearity. Using an available hyperabrupt junction varactor for the diodes 20, 21, with $\gamma$=0.75, a near optimal match to the tangent function is obtained over a limited phase shift range, when a suitable series inductive reactance 40, 42 is used, for a subharmonic reference signal of 3.6 GHz.

The fractional range phase modulated signal at the output 22 of the reflection phase shifter 10 is fed to a field effect transistor (FET) frequency/phase multiplier 12. The frequency/phase multiplier 12 translates the modulated subharmonic reference signal to the desired carrier frequency and expands the linear phase modulation range to greater than 360 degrees. The multiplier 12 consists of a GaAs FET 26, input and output matching circuitry 28, 30, output harmonic termination circuitry 32, and biasing circuitry 62, 63. The FET 26 is biased strongly Class C to obtain a conduction angle at the gate that maximizes the 5th harmonic. Input and output matching circuitry 28, 30 should be designed to provide simultaneous conjugate match at 3.6 GHz on the input and 18 GHz on the output. A simple coupled line bandpass filter (BPF) 32 is provided on the output to reject all unwanted spurious harmonic signals. The combination of the BPF 32, output matching circuitry 30, and drain biasing circuitry 62 effectively short circuits the drain at all harmonics other than the 5th harmonic for the sample implementation. More complicated harmonic termination circuitry on the FET input and output could also be used but was unnecessary for the sample implementation.

The input matching circuitry 28 is preferably implemented using microstrip as shown in FIG. 2B, and is provided to conjugately match the phase shifter output impedance to the low input gate impedance of the FET 26 at the subharmonic reference frequency. The input impedance of the FET 26 is essentially reactive, which makes wideband input matching very difficult. The effect of mismatch at the FET gate 46 is a variation in gate signal level. This, together with non-constant phase shifter output impedance as a function of modulating signal voltage causes a variation in the FET conduction angle. The harmonic output level in high harmonic FET multipliers is fairly sensitive to conduction angle, so significant amplitude modulation (AM) can be a result in the output phase modulated signal if this input matching is poor. This effect is offset by the increase in effective output bandwidth by a factor of xN as a result of frequency multiplication, so a narrowband subharmonic gate match is generally acceptable.

The multiplication factor for the sample implementation is x5. If multiplication factors greater than x7 are required, an additional frequency/phase multiplier 50, constructed as the multiplier 12 with a Class C biased FET stage 26, along with interstage matching and harmonic termination circuitry, can be added as shown in FIG. 3. The gate 46 of the FET 26 is biased for a realistic conduction angle that maximizes the 5th harmonic output level (about 140 degrees). The gate bias and the FET input signal level should be carefully selected according to known techniques to provide unconditional stability at all subharmonics of the output carrier frequency. If the combination of gate bias and input signal amplitude pulls the peak gate voltage too far below the gate threshold voltage, the transistor becomes conditionally stable at subharmonic frequencies of the output, and is very difficult to terminate. The input and output microstrip matching networks 28 and 30 should be designed to provide simultaneous conjugate matching to the FET at 3.6 GHz on the input and 18 GHz on the output in the exemplary implementation. A 2nd order coupled line bandpass filter (BPF) 32 is used on the output of the matching network 30 to select the desired phase modulated signal and reject all unwanted spurious harmonic signals. The filter rejection is adequate to maintain all spurious harmonic output signals at below −30 dBc. The phase modulated carrier signal 48 with 360 degree linear phase modulation range is output from the FET multiplier 12 at a level of approximately −10 dBm.

Using this novel hardware architecture, a sample circuit was designed at 18 GHz using microstrip as is shown for example at 34 in FIGS. 2A and 2B for a sample 360 degree linear phase modulator implementation at 18 GHz, on a 25 mil thick Alumina substrate (not shown) with $\epsilon_r$=9.8 and metal thickness of 0.15 mil. Hyperabrupt, GaAs chip varactors 20, 21, with $\gamma$=0.75, $C_{max}$=2.4 pF, and parasitic package capacitance of $C_p$=0.15 pF, were used in the fractional phase shifter reactive terminations 36, 38 along with 3.5 nH of series inductance. A general purpose medium power GaAs FET 26 was used in the frequency/phase multiplier section.

The sample phase modulator provided a total phase modulation range of >400 degrees. The typical linear phase modulation range was between 360 and 370 degrees over a 700 MHz bandwidth at 18 GHz. The phase error from linear over this linear phase modulation range was typically between ±0.5 to ±1.5 degrees, for a varactor reverse bias voltage in the 0 to 15 V range. All output harmonic spurious signals are below −30 dBc, and the circuit conversion loss is approximately 15 dB. The maximum frequency of baseband modulating signals is on the order of 300 MHz.

For analog PM, baseband modulating signals 44 are DC biased and scaled to be within the linear phase modulation range of the phase modulator (0 to 15 V corresponding to a phase modulation range of ±180 degrees for the sample implementation and ±180/N degrees for the voltage controlled phase shifter 10) and injected directly into the voltage controlled phase shifter 10. For analog FM, baseband modulating signals 44 are first integrated, then DC biased and scaled to be within the linear phase modulation range of the phase modulator and injected directly into the voltage controlled phase shifter 10.

Figure 4:
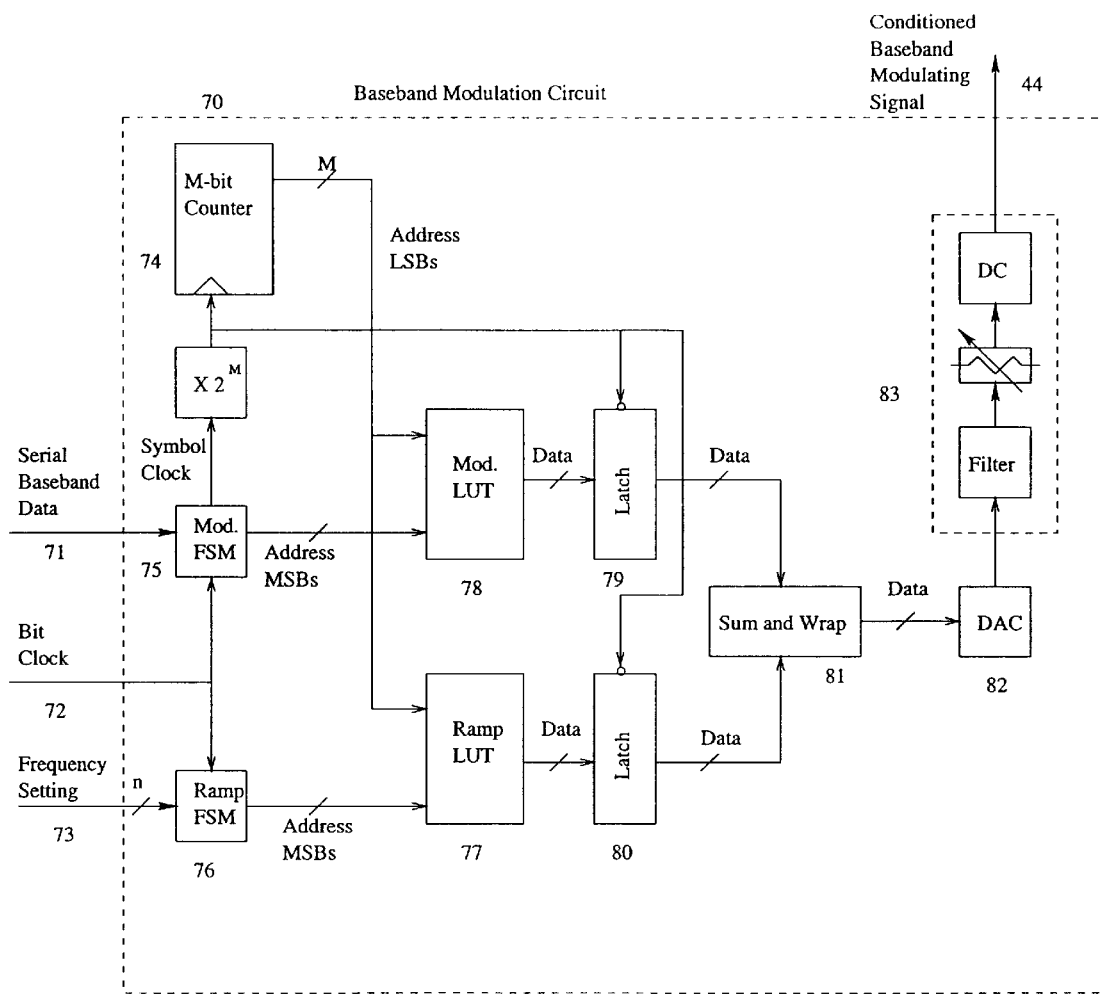
FIG. 4 is a functional block diagram of the baseband modulation circuit.

Conditioned baseband modulating signals 44 from the baseband modulation circuit 70 (FIG. 4) are injected into the voltage controlled phase shifter 10 for digital PM, including both PSK and CPM techniques, as well as indirect FSK modulation. Serial baseband data 71 and the data clock 72 are inputs to a finite state machine 75 (FSM) implemented in programmable digital hardware. The FSM 75 is initialized in an appropriate state representing the initial phase or frequency symbol of the chosen modulation method. Baseband data bits 71 are clocked in k bits at a time to form one of $2^k$ symbols for the chosen modulation method, which can represent absolute carrier phase states or can be differentially encoded to represent changes in carrier phase from the previous symbol. Based on the current phase state and the next input symbol, the FSM 75 determines the appropriate output excess phase trajectory required to arrive at the next carrier phase state during the symbol period.

Sample values for all possible valid output excess phase trajectories between symbols are stored in read-only-memory (ROM) or random-access-memory (RAM) look-up tables 78 (LUT) and accessed by the FSM 75 by asserting ROM/RAM address lines which access the correct area of memory for the desired phase trajectory. Samples for the desired phase trajectory are clocked out of the LUT 78 at $\times 2^M$ of the symbol rate, by an M bit binary counter 74 driving the low address lines of the ROM/RAM. The factor M is chosen to provide the desired level of oversampling with respect to the symbol period for the synthesized excess phase trajectory.

The frequency agility portion of the circuit 73, 76, 77, 80, and 81 is explained in subsequent paragraphs. Assuming for the present description that if no frequency offset 73 is set, the sum and wrap block 81 has no effect on the LUT 78 phase trajectory samples and the samples are latched 79 and passed to the digital to analog converter 82 (DAC). After reconstruction filtering, gain, and DC biasing 83 to be within the linear phase modulation range of the phase modulator (0 to 15 V corresponding to a phase modulation range of ±180 degrees for the sample implementation and ±180/N degrees for the voltage controlled phase shifter 10) the conditioned baseband modulating signals 44 are injected into the voltage controlled phase shifter 10.

The LUT 78 is a very powerful method of implementing any possible output phase trajectory for any PM or FM method, providing that trajectories crossing the ±180 degree point in output excess phase are represented by a voltage discontinuity in the LUT from Vmax to Vmin of the linear modulation range. FM trajectories can be synthesized with stored data samples representing integration of the modulating signal over the symbol period. Also, prefiltering which is commonly applied with many modulation methods to restrict the modulated signal spectrum can easily be applied to the phase trajectories stored in the LUT.

A good example of a modulation method that can be generated which demonstrates the effectiveness of the invention and the baseband modulation circuit 70 is Gaussian Minimum Shift Keying (GMSK) modulation. Minimum shift keying (MSK) is a special case in the family of constant envelope continuous phase modulation (CPM) signals. MSK is equivalent to continuous phase frequency shift keying (CPFSK) with a modulation index of 0.5. A more subtle interpretation of MSK modulation is as CPM modulation, where the carrier phase is controlled continuously over the full 360 degree range. For the MSK modulated signal with modulation index of 0.5, the excess phase of the carrier during the modulating signal bit interval changes, continuously, by ±90 degrees (±90/N degrees in the voltage controlled shifter 10).

The spectral side lobes of the MSK modulated signal roll off rather slowly. This wideband spectral characteristic is a result of the sharp phase transitions in the modulated signal. A premodulation Gaussian lowpass filter is generally used with MSK, to smooth the sharp phase transitions and filter the out of band power. On first glance, one might suspect that the required Gaussian filter response will be altered as a result of nonlinear multiplication in the frequency/phase multiplier 12.

Fortunately, this is not the case, as the nonlinearity produces linear phase multiplication. As the conditioned baseband modulating signal 44 is proportional to the fractional phase modulator 10 phase shift, the Gaussian filtering can be applied directly to the conditioned baseband modulating signal 44 by including it in the phase trajectory samples stored in the LUT 78. The filtered, fractionally modulated carrier phase will be correctly scaled by the linear phase multiplication to produce the desired Gaussian filtering effect.

Figure 5:
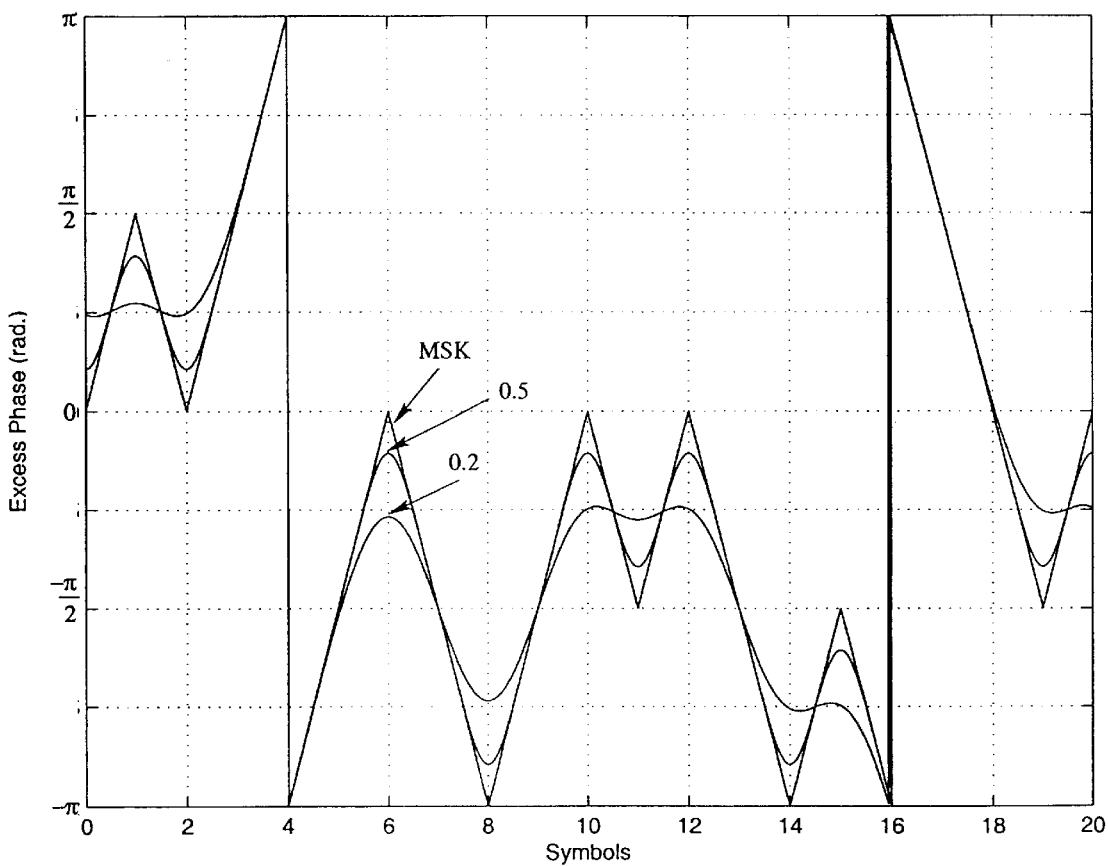
FIGS. 5 and 6 show sample waveforms for GMSK modulated carrier excess phase with prefiltering and discontinuity and corresponding conditioned baseband modulating signals.
Figure 6:
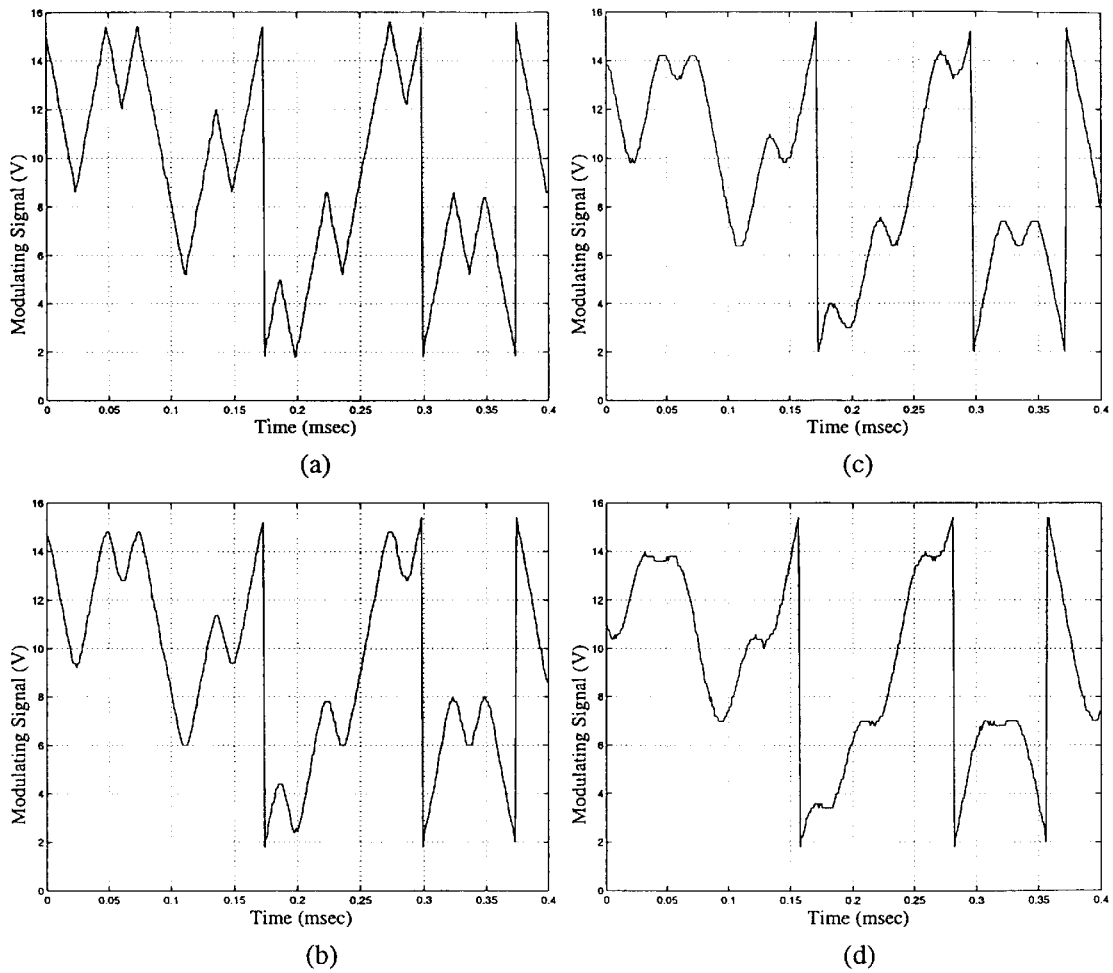
Figure 7:
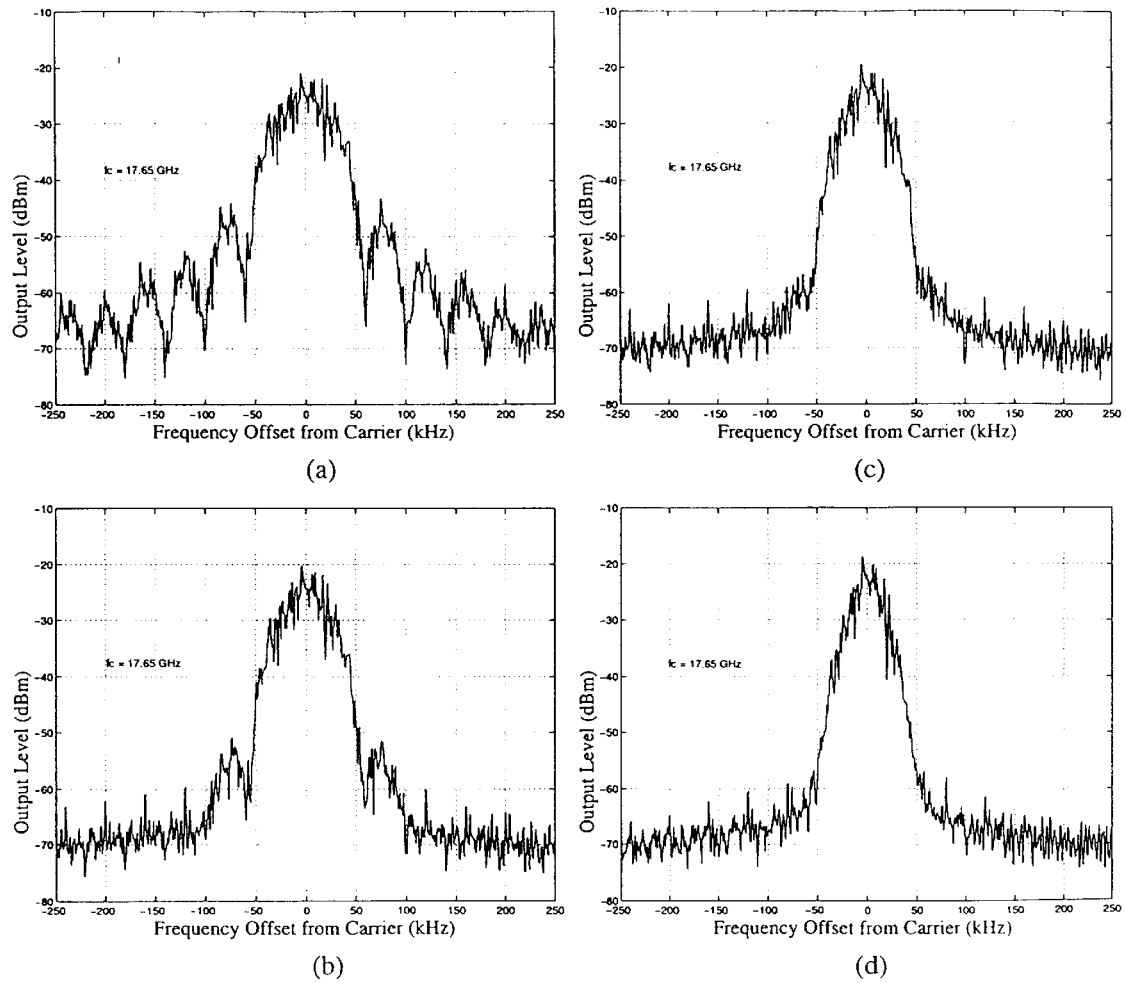
FIG. 7 shows sample GMSK modulated signal spectra for an example phase modulator operating at 17.65 GHz.

The voltage discontinuity, corresponding to an addition of 360 degrees in excess phase (360/N degrees in the voltage controlled shifter 10), must remain unfiltered by the Gaussian filter when implemented in the LUT. Therefore, GMSK is a good test of the effectiveness of the invention and the baseband modulation circuit 70 since the samples stored in the LUT 78 represent exercising the full 360 degree phase modulation range, involve integration as indirect FM, and include prefiltering. Waveforms representing sample trajectories in carrier excess phase including discontinuity are shown in FIG. 5 for various values of $BT_b$, representing the Gaussian filter bandwidth (B) normalized to the bit period ($T_b$). FIG. 6 shows the corresponding conditioned baseband modulating signals 44 as generated by the baseband modulation circuit 70, with phase trajectory data stored in the LUT 78 consisting of 64 data points per symbol (ie: M=6 for the sample data shown). FIG. 7 shows the modulated output signal 48 spectra for the conditioned baseband modulating signals 44 shown in FIG. 6, for a sample implementation of the invention operating at an output frequency of 17.65 GHz.

Another promising application of this modulator is for ultra-small frequency translations. To demonstrate this principle, a 10 kHz sawtooth signal, with voltage waveform shown in FIG. 8A, was injected into the modulator. The sawtooth modulating signal corresponds to a linear increase in the carrier phase of 360 degrees (360/N degrees in the voltage controlled shifter 10) in a time, T, and results in a carrier frequency shift of 1/T Hz from the apparent carrier frequency. A similar sawtooth waveform with a decreasing slope would correspond to a linear decrease in the carrier phase of 360 degrees in a time, T, and a carrier frequency shift of −1/T Hz from the apparent carrier frequency. FIG.

Figure 8A:
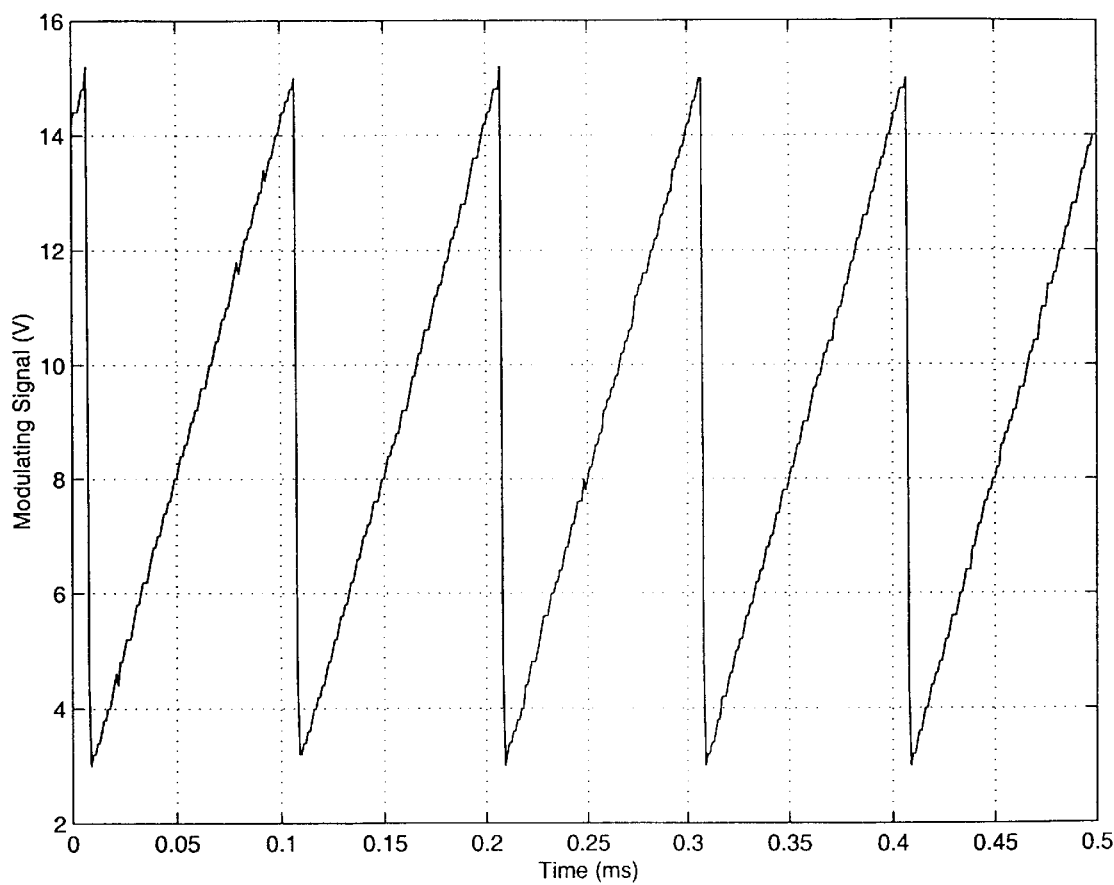
FIGS. 8A and 8B shows a sample conditioned sawtooth modulating signal and corresponding generation of an ultra-small carrier frequency translation at 17.5 GHz.
Figure 8B:
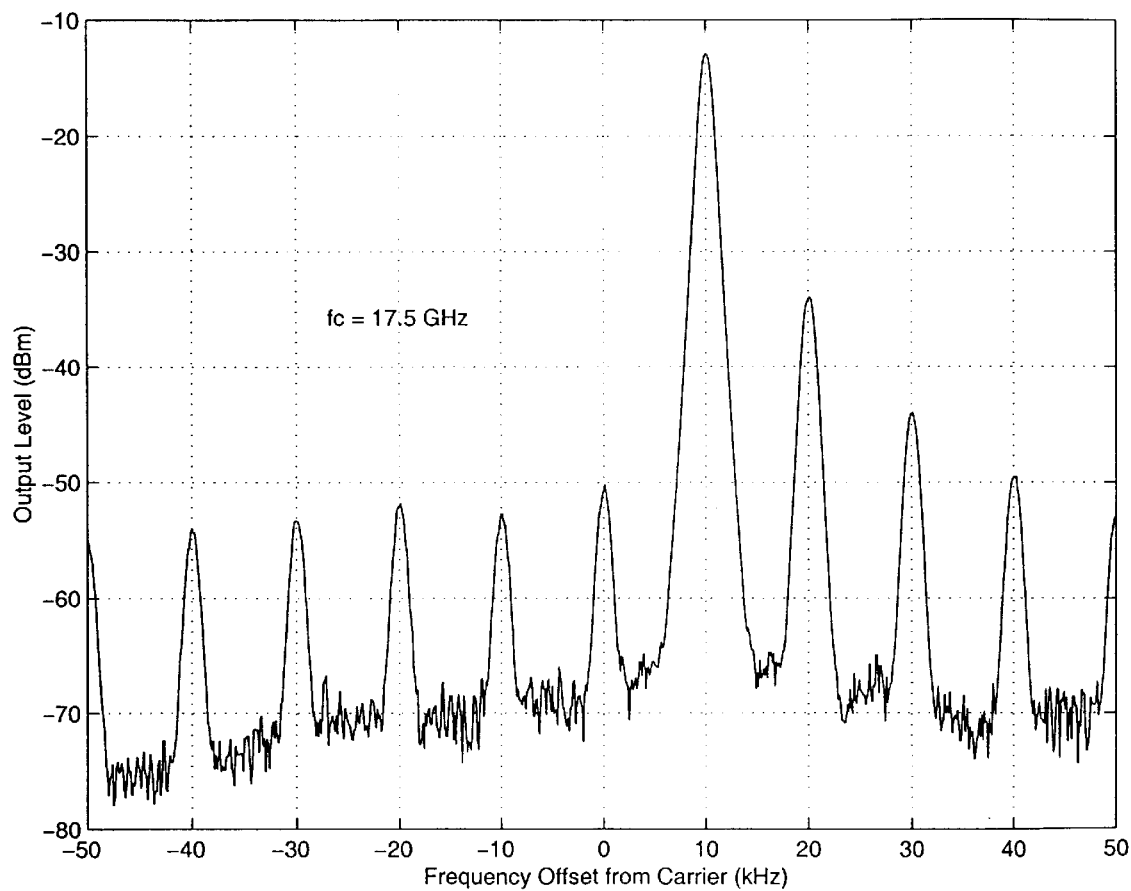

8B shows the output spectrum at an apparent carrier frequency of 17.5 GHz, with the sawtooth modulating signal of FIG. 8A, and demonstrates the frequency shift of 10 kHz. The low levels of the sidebands shown in FIG. 8B are indicative of the high degree of phase linearity in the modulator. This demonstrates that the modulator can be used to provide stable, ultra-small frequency translations at microwave frequencies. The translation frequency is controlled by varying the frequency of the sawtooth modulating signal.

The frequency agility portion of the circuit 73, 76, 77, 80, and 81 is used to realize this functionality, when the modulation generation portion of the baseband modulation circuit 70 is disabled and the output of the modulation latch 79 is zero. The frequency of the sawtooth signal is set by controlling a number of inputs 73 to a finite state machine 76 (FSM) implemented in programmable digital hardware. The bit clock 72 is used to clock the FSM 76, so the period of the sawtooth waveform is generally a fraction or multiple of a symbol period, although if the modulation generation portion of the baseband modulation circuit 70 is disabled, the input clock 72 can be any clock signal. The FSM 76 is initialized at an initial phase for the sawtooth waveform. Like the modulation FSM 75 described above, the FSM 76 controls appropriate address lines in the ramp LUT 77 to select the desired samples required to synthesize the desired sawtooth modulating signal, which are clocked out of the LUT 77 by the counter 74 running at the oversampled clock rate. Assuming for the present description that if no modulation is set, the sum and wrap block 81 has no effect on the LUT 77 phase trajectory samples and the samples are latched 80 and passed to the DAC 82. After reconstruction filtering, gain, and DC biasing 83 to be within the linear phase modulation range of the phase modulator (0 to 15 V corresponding to a phase modulation range of ±180 degrees for the sample implementation and ±180/N degrees for the voltage controlled phase shifter 10) the conditioned sawtooth modulating signals 44 are injected into the voltage controlled phase shifter 10.

If the complete baseband modulation circuit 70 is enabled, the sawtooth generation portion, causing ultra-small carrier frequency translation in the modulated output signal, and the modulation portion combine to realize a frequency agile phase modulated output signal. The combining of the contributions of the phase modulation and frequency shifting to the output excess phase trajectories is accomplished by the sum and wrap 81 block which is implemented in programmable digital hardware. The sum and wrap 81 block takes samples from the modulation LUT 78 and ramp LUT 77, sums them digitally, and performs the necessary wrapping from Vmax to Vmin of the linear modulation range corresponding to the ±180 degree point in output excess phase. These conditioned samples are passed to the DAC 82. After reconstruction filtering, gain, and DC biasing 83 to be within the linear phase modulation range of the phase modulator (0 to 15 V corresponding to a phase modulation range of ±180 degrees for the sample implementation and +180/N degrees for the voltage controlled phase shifter 10) the modulating signals 44 which are conditioned for phase modulation as well as frequency agility are injected into the voltage controlled phase shifter 10. A waveform representing a sample trajectory in carrier excess phase including discontinuity is shown in FIG. 9 for MSK modulation with a frequency translation of $\frac{1}{4}T_b$ from the apparent carrier frequency.

While a preferred implementation has been described, the invention is not limited to the exemplary features described. A person skilled in the art will appreciate that immaterial variations are intended to be encompassed within the scope of the invention.

The embodiments of the invention in which an exclusive property or privilege is claimed are defined as follows:

1. A method of phase modulating a signal, the method comprising the steps of:
    phase modulating a first signal at a first frequency by modulation with a baseband information signal and a ramp signal over a range of at least 360°/N where N is an integer greater than 1 and
    frequency multiplying the first signal by a factor of N to produce a second signal having a second frequency, higher than the first frequency, and thus expanding the phase of the second signal by a factor of N, the ramp signal providing for variation of the second frequency.

2. The method of claim 1 in which the baseband information signal is conditioned for one of the group of modulation schemes consisting of phase modulation, phase shift keying, continuous phase modulation, frequency modulation and frequency shift keying.

3. The method of claim 1 in which the baseband information signal is an integrated baseband information signal.

4. The method of claim 1 in which the baseband information signal is combined with a ramp signal by summing a sawtooth signal with the baseband information signal, wherein the sawtooth signal has a period of T seconds and peak-to-peak amplitude proportional to a 360° change in second signal phase, whereby the second signal is provided with a frequency shift of 1/T Hz.

5. The method of claim 4 in which the sawtooth signal has a positive slope to cause a frequency shift.

6. The method of claim 5 in which the sawtooth signal has a negative slope to cause a negative frequency shift.

7. The method of claim 1 further comprising the step of conditioning the baseband information signal with sample values from a look up table, the look up table being connected to provide sample values to a voltage controlled phase shifter.

8. The method of claim 7 further comprising the step of applying a filter to the baseband modulation signal by conditioning of the sample values contained in the look up table.

9. The method of claim 8 in which the filter is a Gaussian filter.

10. The method of claim 4 in which sampled values of a sawtooth signal are implemented in a look up table and summed with sampled values of a baseband information signal.

11. The method of claim 2 in which sampled values of a sawtooth signal are implemented in a look up table and summed with sampled values of a baseband information signal.

12. The method of claim 1 in which the first signal has a frequency in the range from 1 to 100 GHz.

13. A 360 degree linear phase modulator, for continuous modulation of the phase of a carrier signal having a carrier frequency, comprising:
    a linear phase shifter comprising a quadrature coupler having an input port, reflective terminations and an output port, the input port being connected to a source of a reference signal at a subharmonic frequency of the carrier frequency, the linear phase shifter being operable over a fraction of the full 360 degree range, the reflective terminations having a respective reactance controlled by a corresponding linear control signal from a source of a baseband information signal, the baseband information signal being combined with a ramp signal; and a frequency multiplier operatively connected to the output port for translating the subharmonic reference frequency to the carrier frequency and restoring greater than 360 degree phase shift range, whereby the ramp signal provides for variable frequency operation of the 360 degree linear phase modulator.

14. The linear phase modulator of claim 13 which the reference signal has a frequency in the range from 1 to 100 GHz.

15. The linear phase modulator of claim 13 in which each one of the reflective terminations comprise respective reverse biased varactor diodes.

16. The linear phase modulator of claim 13 in which each reflective termination comprises a respective grounded series combination of a corresponding abrupt junction varactor and an inductive reactance.

17. The linear phase modulator of claim 13 in which each reflective termination comprises a respective grounded series combination of a corresponding hyperabrupt junction varactor and an inductive reactance.

18. The linear phase modulator of claim 13 in which the frequency multiplier comprises a field effect transistor.

19. The linear phase modulator of claim 13 in which the frequency multiplier is a multiple stage frequency multiplier.

20. The linear phase modulator of claim 13 further comprising:

an integrator connected between the source of the baseband information signal and the linear phase shifter, the control voltage corresponding to a combination of the ramp signal and an integration of the baseband information signal.

21. The linear phase modulator of claim 13 in which the ramp signal is provided by means operatively connected to the source of the baseband information signal for summing a sawtooth signal with the baseband information signal, wherein the sawtooth signal has a period of T seconds and peak-to-peak amplitude proportional to a 360° change in carrier signal phase, whereby the output from the frequency multiplier is a modulated signal provided with a frequency shift of 1/T Hz.

22. The linear phase modulator device of claim 21 in which the sawtooth signal has a positive slope to cause a positive frequency shift.

23. The linear phase modulator of claim 21 in which the sawtooth signal has a negative slope to cause a negative frequency shift.

24. The linear phase modulator of claim 13 further comprising a look up table containing sample values for conditioning the baseband information signal, the look up table being connected to provide sample values to the linear phase shifter.

25. The linear phase modulator of claim 24 in which a filter is applied to the baseband modulation signal by conditioning of the sample values contained in the look up table.

26. The linear phase modulator of claim 25 in which the filter is a Gaussian filter.

27. The linear phase modulator of claim 13 in which sampled values of a sawtooth signal are implemented in a look up table and summed with sampled values of the baseband information signal.

28. The linear phase modulator of claim 21 in which sampled values of a sawtooth signal are implemented in a look up table and summed with sampled values of the baseband information signal.

29. The phase modulation device of claim 13 in which the reference signal has a frequency in the range from 1 to 100GHz.

30. A phase modulation device, comprising:

a voltage controlled phase shifter connected to receive a reference signal, a baseband information signal and a ramp signal, the baseband information signal and the ramp signal acting as a control voltage for phase modulating the reference signal to generate a modulated signal;

a first frequency multiplier operatively connected to the voltage controlled phase shifter for receiving the modulated signal from the voltage controlled phase shifter and for frequency multiplying the modulated signal to generate a modulated carrier signal whose frequency is a multiple of the frequency of the reference signal; and the ramp signal being selected to vary the frequency of the modulated carrier signal.

31. The phase modulation device of claim 30 in which the baseband information signal is conditioned for one of the group of modulation schemes consisting of phase modulation, phase shift keying, continuous phase modulation, frequency modulation and frequency shift keying.

32. The phase modulation device of claim 30 in which the baseband information is supplied to the voltage controlled phase shifter through a filter.

33. The phase modulation device of claim 32 in which the filter is a Gaussian filter.

34. The phase modulation device of claim 30 in which:

the first frequency multiplier has an integral multiplication factor N; and the modulated carrier signal has a modulation range that is at least 360°/N.

35. The phase modulation device of claim 34 in which the first frequency multiplier comprises:

a harmonic generating circuit, whose output includes harmonics of the modulating signal, including an Nth harmonic; and harmonic termination circuitry for the harmonic generating circuit that selects the Nth harmonic of the output from the harmonic generating circuit.

36. The phase modulation device of claim 30 in which the voltage controlled phase shifter comprises:

a quadrature coupler having a pair of reflection ports; and each of the reflection ports being respectively terminated by equal reactive terminations.

37. The phase modulation device of claim 36 in which each one of the reactive terminations comprise respective reverse biased varactor diodes.

38. The phase modulation device of claim 37 in which each reactive termination comprises a respective grounded series combination of a corresponding abrupt junction varactor and an inductive reactance.

39. The phase modulation device of claim 37 in which each reactive termination comprises a respective grounded series combination of a corresponding hyperabrupt junction varactor and an inductive reactance.

40. The phase modulation device of claim 34 which the first frequency multiplier comprises a field effect transistor.

41. The phase modulation device of claim 30 further comprising a second frequency multiplier operatively connected to the first frequency multiplier for receiving the modulated carrier signal and for translating the modulated carrier signal to a higher frequency.

42. The phase modulation device of claim 30 in which the baseband information signal is integrated before input to the voltage controlled phase shifter.

43. The phase modulation device of claim 30 in which the ramp signal is provided by means for summing a sawtooth signal with the baseband information signal, wherein the sawtooth signal has a period of T seconds and peak-to-peak amplitude proportional to a 360° change in second signal phase, whereby the modulated carrier signal is provided with a frequency shift of 1/T Hz.

44. The phase modulation device of claim 43 in which the sawtooth signal has a positive slope to cause a positive frequency shift.

45. The phase modulation device of claim 43 in which the sawtooth signal has a negative slope to cause a negative frequency shift.

46. The phase modulation device of claim 31 further comprising a look up table containing sample values for conditioning the baseband information signal, the look up table being connected to provide sample values to the voltage controlled phase shifter.

47. The phase modulation device of claim 46 in which a filter is applied to the baseband modulation signal by conditioning of the sample values contained in the look up table.

48. The phase modulation device of claim 47 in which the filter is a Gaussian filter.

49. The phase modulation device of claim 43 in which sampled values of a sawtooth signal are implemented in a look up table and summed with sampled values of a baseband information signal.

50. The phase modulation device of claim 46 in which sampled values of a sawtooth signal are implemented in a look up table and summed with sampled values of a baseband information signal.

51. The phase modulation device of claim 30 in which the reference signal has a frequency in the range from 1 to 100 GHz.

* * * * *